Oct. 20, 1942.　　A. J. ROSENBERGER　　2,299,179
FLUID SEAL
Filed Sept. 8, 1941
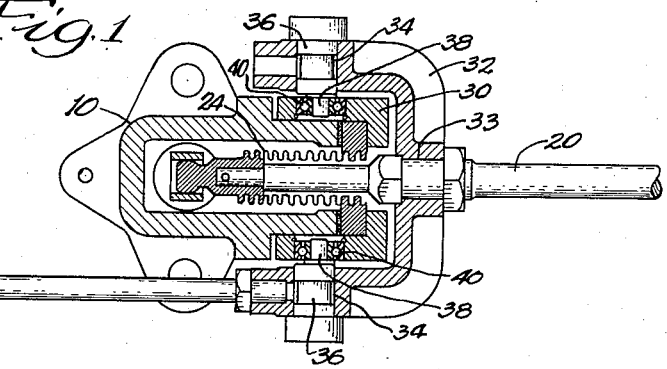
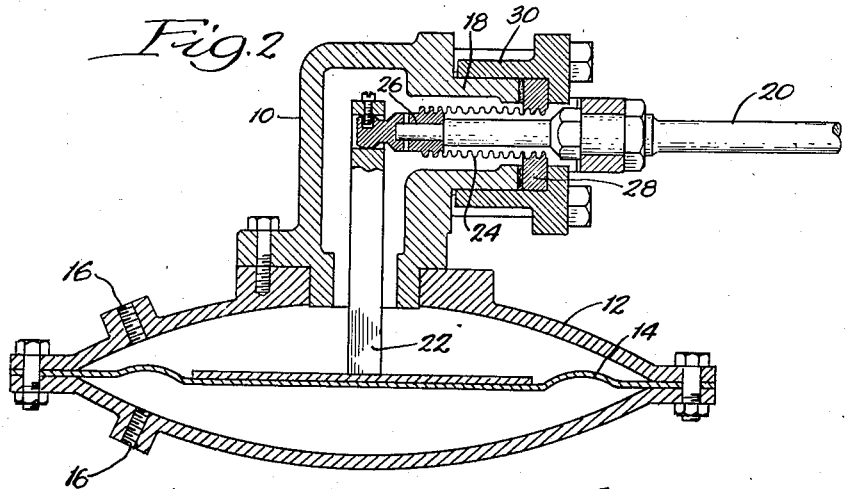
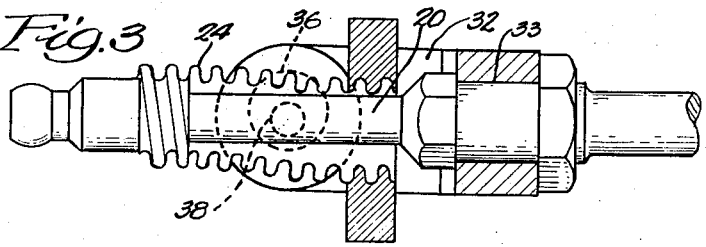
Inventor
Albert J. Rosenberger
Attorneys.

Patented Oct. 20, 1942

2,299,179

UNITED STATES PATENT OFFICE 2,299,179

FLUID SEAL

Albert J. Rosenberger, Wilmette, Ill., assignor to Republic Flow Meters Company, Chicago, Ill., a corporation of Illinois Application September 8, 1941, Serial No. 409,996

4 Claims. (Cl. 286—29)

This invention relates to fluid seals and more particularly to sealing structures for use with fluid pressure operated instruments.

In pressure operated instruments such, for example, as fluid flow meters, operated by differential pressure, it is necessary to transmit a force from an enclosed housing to a point outside the housing, as for example, by means of a movable lever or the like. In order that the instrument may operate properly, the lever must be sealed against leakage of fluid therepast and the seal must not impose frictional resistance or other unbalancing forces on the lever. It has been proposed to utilize flexible diaphragms to provide a seal between the housing and the lever, but in constructions of this type, an impossible degree of accuracy in manufacture is required to avoid a tilting force on the lever, caused by action of the pressure on the sealing diaphragm.

One of the objects of the present invention is to provide a fluid seal for use in instruments of this character in which friction is materially reduced and any forces created by action of the fluid on the sealing element are neutralized.

Another object of the invention is to provide a fluid seal for a pivoted lever of a pressure operated instrument in which the pivots may be adjusted so that any force created by the sealing element acts radially of the pivotal axis and has no tilting effect on the lever.

The invention will be more readily understood by reference to the accompanying drawing, in which:

Figure 1 is a sectional top view of a fluid seal and accompanying instrument parts;

Figure 2 is a vertical section through the seal structure; and

Figure 3 is an enlarged view similar to Figure 2, indicating the manner of adjustment of the pivots.

The seal struture comprises a hollow housing 10, adapted to be mounted on a diaphragm chamber 12, separated by a flexible diaphragm 14, which is adapted to be exposed on its opposite sides to a differential pressure through tap openings 16. The housing has a horizontal projecting portion 18, and is adapted to receive the one end of a lever 20, whose movements are to be controlled by the diaphragm. For this purpose, the diaphragm is connected through a link 22 with the end of the lever lying inside the housing.

Escape of fluid from the housing past the lever is prevented by a corrugated bellows 24, formed of thin metal or other suitable material, and connected at one end to an enlarged head 26 on the end of the lever 20. At its opposite end, the bellows is connected to a collar 28, which is adapted to fit against the end of the horizontal housing portion 18, and which is held in place thereon by a sleeve 30.

The lever is pivotally supported by means of a yoke 32, having a bore 33 in its central portion to receive the lever, and having aligned bores 34 in its ends. In machining the yoke 32, it is desirable that the axis of the bore 33 intersect exactly the axes of the bores 34, but in commercial practice, it is impossible to be sure that this condition will always be obtained.

In order to compensate for misalignment of the bore axes, the bores 34 receive cylindrical plugs 36, which are rotatable in the bores and which carry at their ends eccentrically mounted pins 38. The pins 38 are rotatably supported in bearings 40, carried by the sleeve 30. By turning the plugs 36, the axis of the pins 38 may be adjusted transversely of the lever 20, so as to be aligned therewith. Under these circumstances, the pressure exerted by the bellows 24 due to fluid acting thereon is always in a line with the pivotal axis of the lever, so that the bellows exerts no tilting force on the lever.

This condition is shown in Figure 3, in which the plugs 36 are illustrated out of alignment with the axis of the lever 20, and have been turned to a position such that the pins 38 are exactly aligned with the axis of the lever. In some cases, the bellows itself may not be exactly symmetrical, so that action of the fluid pressure thereon tends to tilt the bellows rather than to exert a straight line force thereon. To compensate for this effect of the bellows, it may be desired under some conditions to set the axis of the pins 38 slightly off center with respect to the axis of the lever 20, and it will be apparent that this may readily be accomplished by the present invention.

In constructing instruments according to the invention, the parts are assembled as shown in the drawing, and the interior of the housing 10 is subjected to fluid pressure. The pivot plugs 36 may then be turned to shift the axis of the pins 38 until the lever 20 is exactly balanced, so that action of the fluid pressure on the flexible seal is completely neutralized. It will be apparent that with this construction the effect of the seal may be neutralized, regardless of substantial inaccuracy in machining the bores 33 and 34, so that the instrument will operate accurately throughout its full range.

While one embodiment of the invention has been shown and described in detail, it will be understood that this is illustrative only, and is not to be taken as a definition of the scope of the invention, reference being had for this purpose to the appended claims.

What is claimed is:

1. A fluid seal for pressure operated instruments comprising a hollow housing adapted to be exposed on its inside to a pressure different than that on its outside, a lever pivoted adjacent the housing and one end of which extends into the housing, a flexible sealing member connecting the lever and housing to prevent flow of fluid around the lever, and adjusting means for the pivotal mounting of the lever to shift its pivotal axis transversely of the lever length to neutralize the turning effect on the lever of pressure on said sealing member.

2. A fluid seal for pressure operated instruments comprising a hollow housing adapted to be exposed on its inside to a pressure different than that on its outside, a lever extending into the housing, a yoke connected to the lever with its ends lying adjacent opposite sides of the housing, a flexible sealing member connecting the lever and housing, and adjustable pivot means connecting the ends of the yoke to the housing for pivotally mounting the lever and adjustable to shift the pivotal axis transversely of the lever.

3. A fluid seal for pressure operated instruments comprising a hollow housing adapted to be exposed on its inside to a pressure different than that on its outside, a lever extending into the housing, a yoke connected to the lever with its ends lying adjacent opposite sides of the housing, a flexible sealing member connecting the lever and housing, said ends of the yoke having aligned cylindrical bores therein, cylindrical plugs rotatably mounted in said bores, and pins eccentrically carried by the ends of said plugs and rotatably connected to the housing pivotally to support the lever.

4. A fluid seal for pressure operated instruments comprising a hollow housing adapted to be exposed on its inside to a pressure different than that on its outside, a lever extending into the housing, a yoke connected to the lever with its ends lying adjacent opposite sides of the housing, a flexible bellows secured at one end to the lever and at its opposite end to the housing around the lever, and adjustable pivot means connecting the ends of the yoke to the housing for pivotally mounting the lever and adjustable to shift the pivotal axis transversely of the lever.

ALBERT J. ROSENBERGER.